(12) United States Patent  
Thiagarajan et al.

(10) Patent No.: US 7,506,324 B2  
(45) Date of Patent: *Mar. 17, 2009

(54) ENHANCED COMPILED REPRESENTATION OF TRANSFORMATION FORMATS

(75) Inventors: Balaji Thiagarajan, San Jose, CA (US); Aleksey M. Savateyev, Foster City, CA (US); Bhushan S. Nene, Foothill Ranch, CA (US)

(73) Assignee: Microsoft Corporation, Redmond, WA (US)

( * ) Notice: Subject to any disclaimer, the term of this patent is extended or adjusted under 35 U.S.C. 154(b) by 500 days.

This patent is subject to a terminal disclaimer.

(21) Appl. No.: 10/934,247

(22) Filed: Sep. 2, 2004

(65) Prior Publication Data

US 2006/0048107 A1    Mar. 2, 2006

(51) Int. Cl.  
  *G06F 9/45* (2006.01)  
  *G06F 17/20* (2006.01)
(52) U.S. Cl. .................. 717/140; 715/235; 715/239
(58) Field of Classification Search .............. 717/136, 717/140; 715/234, 236, 239  
See application file for complete search history.

(56) References Cited

U.S. PATENT DOCUMENTS

| | | | | |
|---|---|---|---|---|
| 6,941,511 | B1 * | 9/2005 | Hind et al. ................ | 715/523 |
| 7,120,869 | B2 * | 10/2006 | Birder ...................... | 715/234 |
| 7,168,035 | B1 * | 1/2007 | Bell et al. ................. | 715/234 |
| 7,275,216 | B2 * | 9/2007 | Paoli et al. ............... | 715/763 |
| 7,328,403 | B2 * | 2/2008 | Ramarao et al. .......... | 715/236 |
| 2002/0184264 | A1 * | 12/2002 | Berg et al. ............... | 707/513 |
| 2003/0014397 | A1 * | 1/2003 | Chau et al. .................. | 707/3 |
| 2003/0200502 | A1 | 10/2003 | Abe et al. | |
| 2003/0225759 | A1 | 12/2003 | Nonko et al. | |
| 2004/0010754 | A1 * | 1/2004 | Jones ....................... | 715/513 |
| 2004/0068487 | A1 | 4/2004 | Barton et al. | |
| 2004/0193661 | A1 * | 9/2004 | Sikchi et al. ............. | 707/205 |
| 2004/0205082 | A1 | 10/2004 | Fontoura et al. | |
| 2005/0268233 | A1 * | 12/2005 | Perla et al. ............... | 715/703 |

OTHER PUBLICATIONS

Hong Su, Harumi Kuno, and Elke A. Rundensteiner, Automating the transformation of XML documents, Proceedings of the 3rd international workshop on Web information and data management WIDM '01, ACM Press, Nov. 2001.*

(Continued)

*Primary Examiner*—Wei Y Zhen  
*Assistant Examiner*—Chih-Ching Chow  
(74) *Attorney, Agent, or Firm*—Vierra Magen Marcus & DeNiro LLP

(57) ABSTRACT

Enhanced compiled representation of transformation formats to enable rapid application development and deployment is described. Techniques for data transformation include receiving a transformation specification, generating an object model using a schema, and transforming the transformation specification into an application-specific document using the object model. A system for data transformation is also described, including a memory configured to receive a transformation specification, and a processor configured to generate an object model using a schema and transform the transformation specification into an application-specific document using the object model. Another system for data transformation includes a compiler configured to receive a transformation specification and generate a hierarchical transformation object model using a schema, and a rendering engine configured to generate an object model from the hierarchical transformation object model, generating an application-specific object model.

20 Claims, 13 Drawing Sheets

OTHER PUBLICATIONS

Sven Groppe and Stefan Böttcher, XPath query transformation based on XSLT stylesheets, Proceedings of the 5th ACM international workshop on Web information and data management WIDM '03, Nov. 2003.*

Ivan Kurtev and Klaas van den Berg, "Document based architecture & applications: Model driven architecture based XML processing", Proceedings of the 2003 ACM symposium on Document engineering DocEng '03, Nov. 2003.*

Dino Esposito, Applied XML Programming for Microsoft.Net, Microsoft Press, Nov. 9, 2002.

Don Box, Aaron Skonnard, and John Lam, Essential XML: Beyond Markup, Addison Wesley Professional, Jul. 13, 2000.

* cited by examiner

```
<postProcessPatterns>
 <pattern>
   <action>Action ID</action>
   <actionParameter1>Action Parameter Text</actionParameter1>
   ...
   <actionParameterN>Action Parameter Text</actionParameterN>
 </pattern>
 ...
</postProcessPatterns>
```

FIG. 7A

```
<postProcessPatterns>
 <pattern>
   <action>Remove Link</action>
   <actionParameter1>123</actionParameter1>
   <actionParameter1>456</actionParameter1>
 </pattern>
 <pattern>
   <action>Link to External Implementation</action>
   <actionParameter1>c:\msxpath 20.dll</actionParameter1>
   <actionParameter2>123</actionParameter2>
   <actionParameter2>456</actionParameter2>
   <actionParameter2>789</actionParameter2>
 </pattern>
</postProcessPatterns>
```

FIG. 7B

ENHANCED COMPILED REPRESENTATION OF TRANSFORMATION FORMATS

FIELD OF THE INVENTION

The present invention relates generally to software. More specifically, enhanced compiled representation of transformation formats.

BACKGROUND OF THE INVENTION

Developing and deploying enterprise software applications for various purposes may be problematic in terms of integration and scalability. In order to implement applications from multiple vendors, integration and architectural issues arise, such as whether to use a single or multiple sources of data to support the disparate applications. Industry standards recommendations such as those endorsed by the World Wide Web Consortium (W3C) were developed for the purpose of addressing these types of issues. By using a standard data format (e.g., XML), software developers, designers, architects, and programmers (hereinafter "developers") can develop numerous, disparate applications for varying purposes. However, common data formats such as XML still pose significant difficulties between applications.

Using XML-formatted data enables applications to present content without the static limitations of HTML. The capability for using a single source of data (e.g., XML-formatted data) with various applications is an attractive feature of XML. By using XML-formatted data, various applications can be tailored to work with a common dataset for purposes such as accounting, supply chain management, financial/currency conversion, operations management, and others. However, XML-formatted data retrieved for use with one application must be transformed before use with other applications. Transformations between applications requires substantial time, effort, and skill to transform XML-formatted data. Another W3C recommendation, Extensible Stylesheet Language Transformation (XSLT) provides standards for performing transformations on XML-formatted. Different applications often require XML documents to be transformed from one XML version to another and, generally, XSLT may be used as a common set of techniques for transformation. However, conventional techniques for performing transformations are also problematic.

Conventional techniques for performing data transformations are typically performed manually. Performing manual transformations does not scale well for applications. Transformations are dependent upon the skills of a developer and may be error-prone. Importing transformations or documents into a specific application requires using specifications from XSLT and XSD files (e.g., files used to generate source code for run-time objects that correspond to an XML schema). Although industry standards recommendations such as XML and XSLT exist, these and other conventional techniques are also problematic when used to migrate data between applications. For example, data from a legacy accounting application may require substantial transformation before being used in a more recent financial application developed by another vendor.

Thus, what is needed is a solution for performing transformations without the limitations of conventional techniques.

BRIEF DESCRIPTION OF THE DRAWINGS

Various embodiments of the invention are disclosed in the following detailed description and the accompanying drawings:

FIG. 7A illustrates an exemplary pattern specification schema;

FIG. 7B illustrates another exemplary pattern specification schema;

DETAILED DESCRIPTION OF THE PREFERRED EMBODIMENTS

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Transformations of documents, document objects, formatted data, and other types of information may be implemented to enable efficient operation of disparate integrated applications and systems. As used herein, applications may refer to computer programs, software, software systems, and software-implemented systems that are suitable for a variety of purposes. Using standards such as XML, XSLT, XPath, and others, the design, deployment, and implementation of integrated applications may be improved by eliminating manual transformations. Further, transformations may be imported into application-specific artifacts or abstractions to facilitate data migration between systems, depending upon application-specific requirements.

Figure 1:
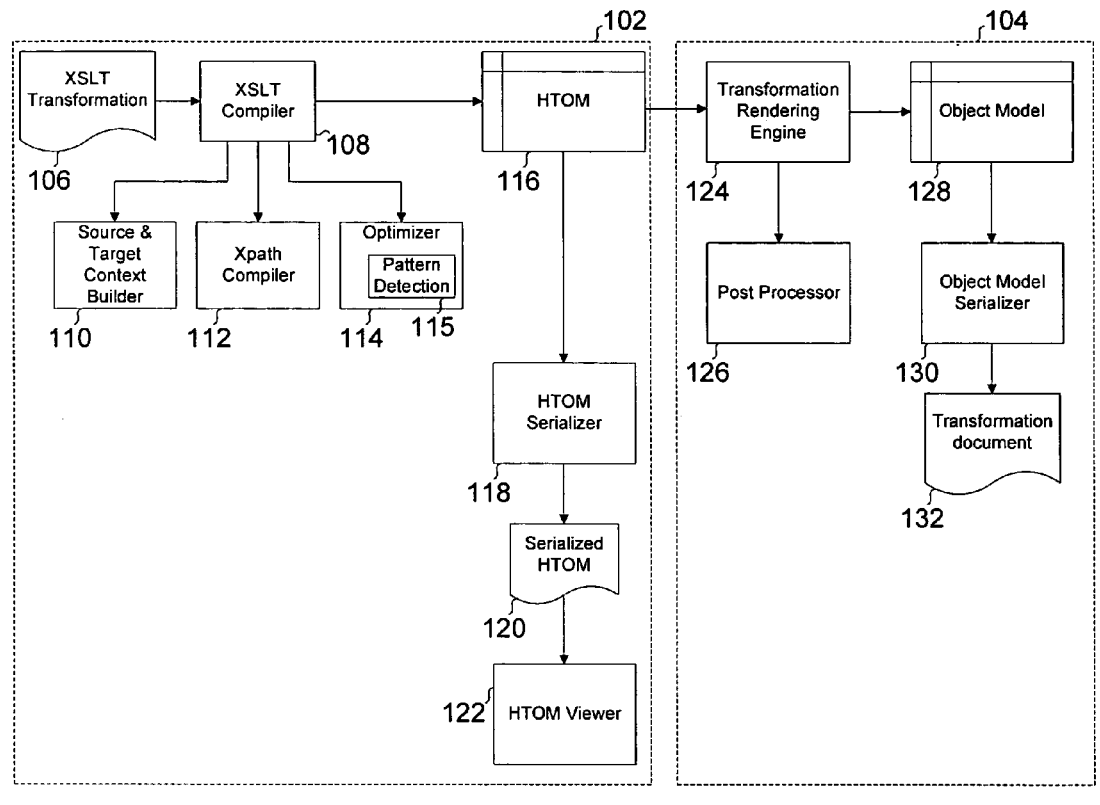
FIG. 1 illustrates an exemplary system for enhanced compiled representation of transformation formats.

FIG. 1 illustrates an exemplary system 100 for enhanced compiled representation of transformation formats. In this example, transformation system 102 and an application system 104 are shown. Transformation system 102 includes XSLT transformation document 106, XSLT compiler 108, source and target context builder 110, XPath compiler 112, optimizer 114, hierarchical transformation object model (HTOM) 116, HTOM serializer 118, serialized HTOM 120, and HTOM viewer 122. Application system 104 includes transformation rendering engine 124 and post processor 126, which produce application-specific object model 128. Object model serializer 130 produces transformation document 132, which may be manipulated or executed by an application. In other examples, more or fewer components may be shown.

In system 100, transformation system 102 and application system 104 act as a tool for importing XSLT transformations using HTOM 116. Application-specific constructs, objects, documents, document objects, artifacts, or other data formats may be transformed. As an example, HTOM 116 provides a generic intermediate base for transforming XSLT transformations for use with specific applications. In other examples, HTOM 116 may be used to transform other data formats other than those described above. Transformation system 102 transforms objects such as XSLT transformation document 106 using various components.

Transformation system 102 develops HTOM 116, which is used to transform data from one format (e.g., XSLT transformation) to another (e.g., XML) for use by various applications. As an example, XSLT transformation document 106 is used by XSLT compiler 108 to create HTOM 116, which is used by application system 104 to generate an application specific object model 128. Components of transformation system 102 and application system 104 enable the manipulation and execution of XSLT transformation document 106.

As an example, XSLT transformation document 106 acts as an input to transformation system 102. Transformation system 102 receives XSLT transformation document 106 and creates HTOM 116, using XSLT compiler 108. Source and target context builder 110, XPath compiler 112, and optimizer 114 may be used by XSLT compiler 108 to generate HTOM 116.

Source and target context builder 110 instantiates a source and target schema on-the-fly and establishes a pointer to an appropriate node in the instantiated schema, for example. Source and target context builder 110 also analyzes XPath expressions and extracts node and axis information. In some examples, source and target context builder 110 may ignore some constructs. Source and target context builder 110 traverses a node and axis determined from the source schema to determine the position of a node referenced in a path specified by the XPath expression being analyzed. If source and target context builder 110 is unable to determine a node, parent and child nodes may be generated along a path in the target object tree for HTOM 116. The children and parent nodes may be referred to as context nodes for XSLT compiler 108. Context nodes are part of a context that is used to evaluate an expression to generate an object. In this example, the evaluation of nodes enables an object tree related to HTOM 116 to be constructed, which may be used to generate application-specific object model 128 and, eventually, application-specific transformation document 132. Here, context may describe a position, size, set of variable bindings, function library, and a set of name space declarations for a given expression. In other examples, context may describe other parameters.

In this example, context nodes generate absolute paths to a node within a source XML document referenced by an XPath expression embedded inside an XSLT construct (e.g., XSLT transformation document 106). XSLT transformation document 106 may be used to point to a particular node or instantiate a particular node in a target tree for a target XML document using HTOM 116. This technique for generating an XML instance to transform a source XML document into a target XML document by analyzing an XPath expression allows the generation of a fragment of an original schema. The fragment of the original schema may be referenced by XSLT transformation document 106.

By generating schema fragments, contextual information may be managed to reduce a memory footprint associated with HTOM 116 and the target schema. A fragment of an original schema tree may be used to generate HTOM 116, application-specific object model 128 and transformation document 132, instead of using an entire source tree from a source XML document, thus reducing memory requirements. XSLT compiler 108 creates HTOM 116 using fragments, which may be parsed from an original source schema tree associated with XSLT transformation document 106.

XSLT compiler 108 parses input XSLT transformation document 106 using, in some examples, a depth-first search algorithm. nodes may be mapped from the object tree to HTOM 116 using an object tree associated with XSLT transformation document 106. XSLT compiler 108 may include a custom handler (not shown) for each XSLT construct received. Some examples of XSLT constructs include xsl:for-each, xsl:if, xsl:choose, and others. In some cases, XSLT constructs such as xsl:for-each may change a source schema context associated with XSLT transformation document 106, while a target element sets up a target schema context in HTOM 116. Constructs may also use a source and target schema context to derive links to source and target schema elements. Expressions (e.g., XPath expressions) contained within XSLT transformation document 106 may provide constructs and source schema elements. Various components of transformation system 102 may be used to derive and render target schema elements in HTOM 116.

As an example, XSLT compiler 108 compiles XSLT transformation document 106 using services provided by source and target context builder 110, XPath compiler 112, and optimizer 114 to create HTOM 116. XSLT compiler 108 may also use services provided by source and target context builder 110 to maintain a source-to-target schema and context during parsing. Each XSLT construct may be used by XSLT compiler 108 to create objects (e.g., XslItemContainer, XslItem, and others) in HTOM 116. An XSLT construct may also have associated XPath expressions to indicate the location of various objects, destination nodes, or other information used to construct HTOM 116. For example, when XSLT compiler 108 encounters an XPath expression, XPath compiler 112 may be invoked to compile the expression. XSLT compiler 108 receives output from XPath compiler 112 and attaches it to an associated object in HTOM 116. XSLT compiler 108 also stamps each object (e.g., xslItem, xslItemContainer, and others) with a unique identifier and also marks up the original XSLT transformation document 106 with the same identifier by adding an attribute to the XSLT node on the object tree associated with the source schema. These unique identifiers correlate compiled HTOM tree fragments with tree fragments in XSLT transformation document 106 and may be used to render tree relationships visually using HTOM viewer 122. XSLT compiler 108 also calls optimizer 114 to optimize generated HTOM 116.

XPath compiler 112 tokenizes an XPath expression into various types of tokens representing axes, functions, constants, and other parameters. XPath compiler 112 also maps each token to an object representation and constructs a parse tree of the objects. The parse tree structure is then returned to XSLT compiler 108, which then attaches it to HTOM 116.

Optimizer 114 traverses the tree structure associated with HTOM 116 in depth-first fashion and eliminates redundant objects. Pattern detection mechanism 115 identifies redundant fragments of HTOM 116 that may be compressed. For example, if an "AND" operator object is connected to another "AND" operator object, then pattern detection mechanism 115 combines the redundant operator objects into a single "AND" operator object. In another example, if two tree fragments are identical, then one of the redundant fragments may be eliminated.

HTOM 116, in this example, is an object model that represents both XSLT objects and XPath expressions in a hierarchical structure. XSLT objects may include XslItemContainer and XslItem. In some examples, XslItem is a type of atomic XSLT construct that represents leaf-levels in the tree-structure of XSLT documents. Examples of XslItem include xsl:value-of and xsl:copy-of. XslItemContainers may be used as containers for other XslItemContainers or XslItems. Examples of XslItemContainers include xsl-for-each, xsl-if, xsl-choose, and others. Examples of both XSLT objects and HTOM 116 are described in greater detail below in connection with FIGS. 2-6, including a sample use case for XSLT constructs. HTOM 116 may also be serialized to generate serialized HTOM 120 and a visual representation in HTOM viewer 122. HTOM 116 is also used by application system 104 for rendering application-specific object model 128, which is tailored to application-specific requirements for generating native application artifacts.

Application system 104 may have various requirements, components, and architecture for rendering HTOM 116. HTOM 116 enables the generation of a specific model that may be used for execution, visualization or other representations for a specific application. In this example, application system 104 receives HTOM 116 at transformation rendering engine 124. Transformation rendering engine 124 uses services of post processor 126 to create application-specific object model 128, which may be serialized to create a file representation that is specific to a particular application. In some examples, a file representation enables manipulation and execution of XSLT transformation document 106 inside an application environment such as application system 104. XSLT transformation document 106 may be used in many application development and integration scenarios.

Application system 104 includes several components including transformation rendering engine 124, post processor 126, application-specific object model 128, object model serializer 130, and transformation document 132. Transformation rendering engine 124 traverses a tree associated with HTOM 116 and transforms XPath expression objects into application-specific objects such as functoids and links. As an example, a functoid is an abstract representation that combines the definition of the functionality and information about the representation in a host environment. In some examples, XPath expression objects may have a one-to-one correspondence with application-specific functoids, while others are mapped to a combination of different functoids. In other examples, XSLT constructs may be handled using specific types of functoids based on application-specific requirements. As an example, transformation rendering engine 124 may replace an HTOM tree fragment with a functoid of type "Inline XSLT Scripting Functoid." Transformation rendering engine 124 may also analyze the containment hierarchy of XslItemContainer objects and create AND or value mapping functoid objects to represent nested conditions.

Transformation rendering engine 124 may also "plug-in" custom functoid implementations based on the configuration of an XML document, object, or file, in some examples. Custom functoids may be implemented and derived from an application-provided base class. Custom functoids may also be created as a public method in frameworks such '.NET' assembly. Depending on a particular implementation, functoids may be represented as different objects in application-specific object model 128. Implementation may be determined by using a configurable XML file that captures information from custom functoids such as namespace, implementing assembly, and either a functoid ID or a function name. In some examples, functoids may not be able to act as input to other functoids, using re-ordering in an object tree associated with application-specific object model 128 to compensate.

Post processor 126 analyzes an application-specific object tree to detect patterns that may not be allowed by transformation rendering engine 124 and re-organizes the object tree to resolve application-specific object model 128. Post processor 126 may be implemented using a "pattern detection XML" file to capture information related to transformation rendering engine 124. Post processor 126 may apply pattern matching and fixing algorithms to re-arrange an object tree associated with application-specific object model 128, which is discussed in greater detail below in connection with FIGS. 7A-7B. Post processor also partitions an object tree into manageable groups, which may be rendered on separate pages in an application schema map.

Object model serializer 130 serializes application-specific specific object model 128 into a memory file (e.g., .btm file). A memory file primarily contains XML nodes with tags such as functoids and links. Memory files may also contain metadata about a transformation such as source schema, target schema, grid, and other parameters. Object model serializer 130 traverses an object tree, formats absolute paths for source and target schemas using a source and target context, and generates associated functoid and link nodes. Object model serializer 130 also generates the correct syntax for functoid nodes depending on the type of functoids. Object model serializer 130 also creates new "page" nodes when an unserialized object is encountered prior to pagination (i.e., placement on a page). In some examples, object model serializer 130 also generates and associates "external object" files for transformation rendering engine 124 to bind custom functions used in inline XSLT functoids to assemblies that implement inline XSLT functoids.

Figure 2:
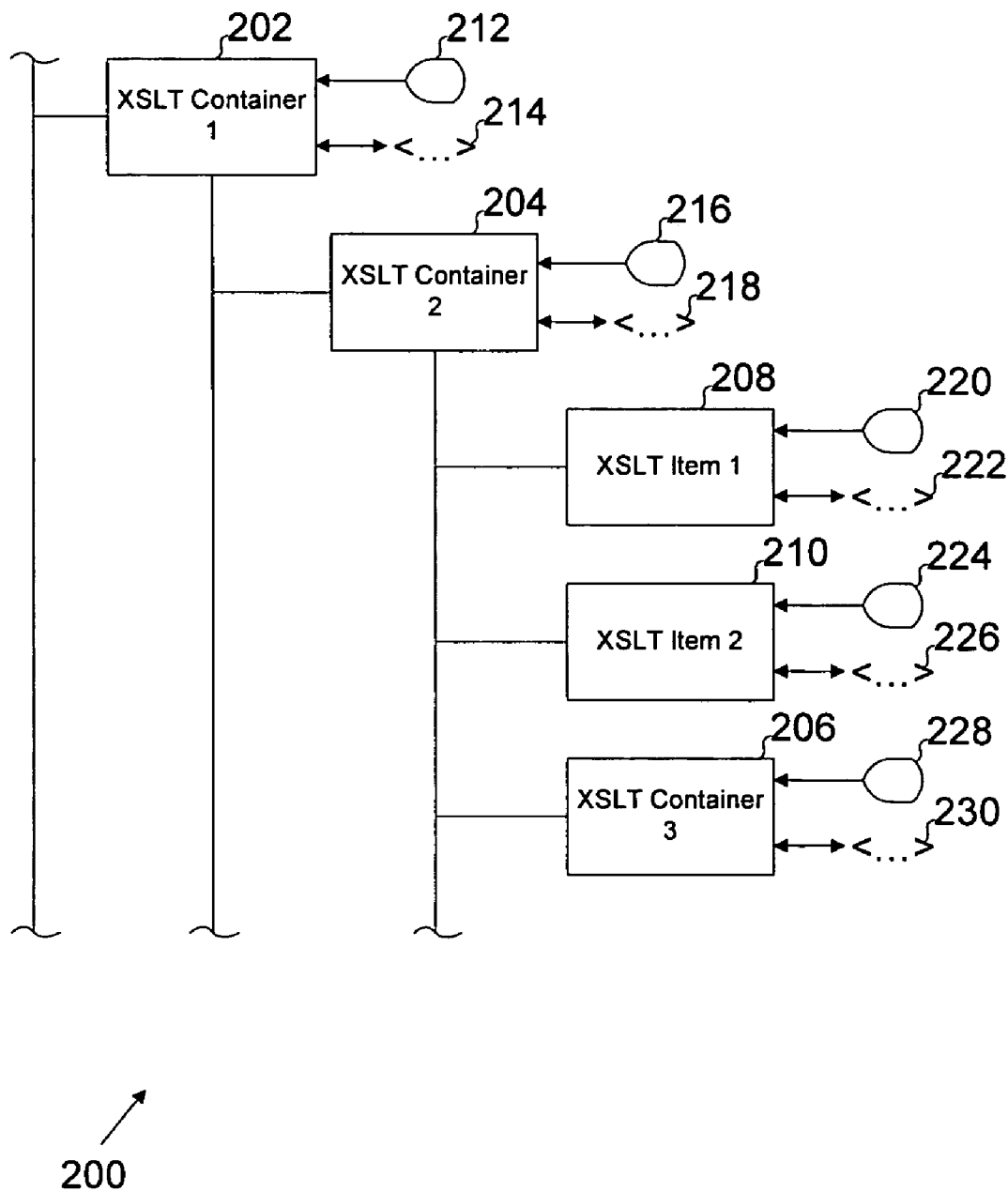
FIG. 2 illustrates an exemplary tree fragment 200 associated with a hierarchical transformation object model (HTOM)

FIG. 2 illustrates an exemplary tree fragment 200 associated with a hierarchical transformation object model (HTOM). In this example, a hierarchical tree fragment associated with HTOM 116 and XSLT transformation 106 is shown. In this example, XslItemContainers 202-206 are shown as roots for XslItems 208-210, which use functions 212, 216, 220, 224, and 228. Links to destination nodes 214, 218, 222, 226, and 230 are also shown, which are used to populate a target tree associated with a target transformation document (e.g, transformation document 132).

Figure 3:
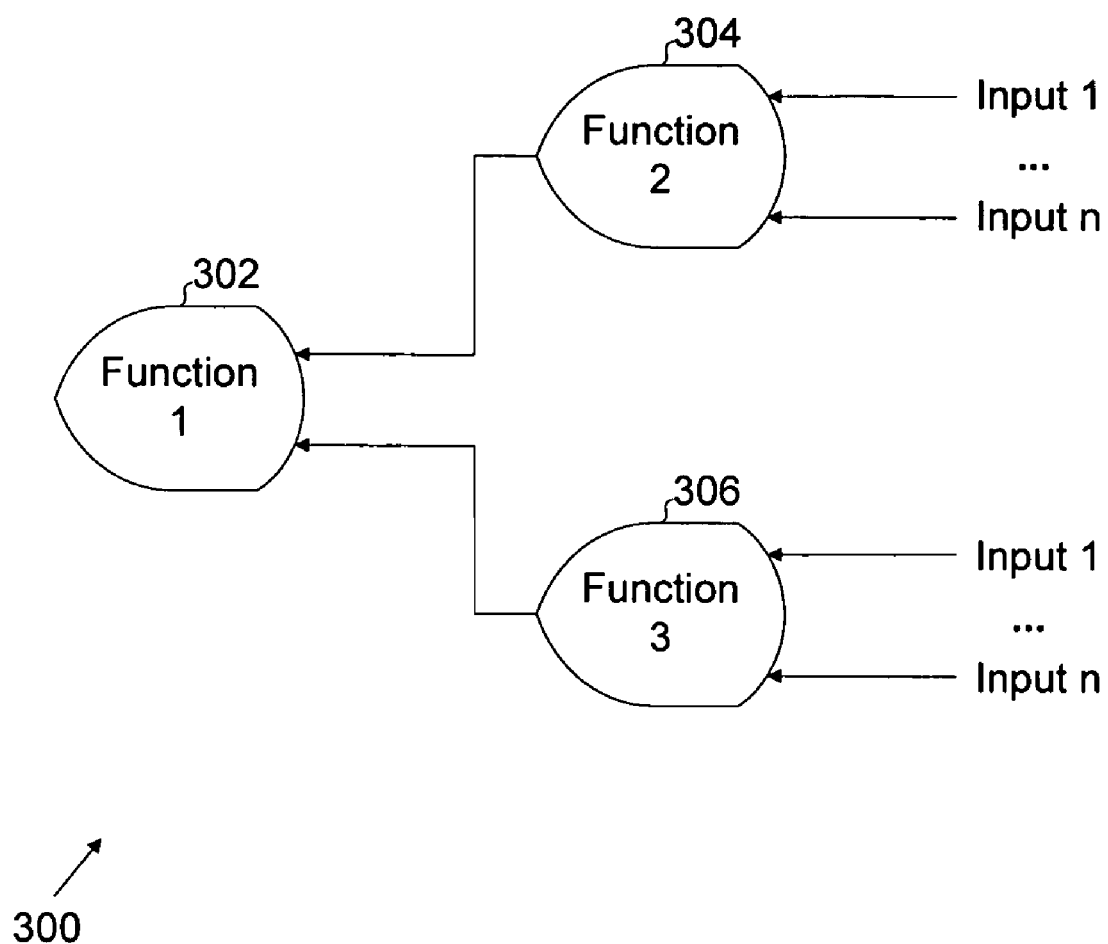
FIG. 3 illustrates an exemplary functions for use with a hierarchical transformation object model.

FIG. 3 illustrates an exemplary functions for use with a hierarchical transformation object model. Here, function tree fragment 300 includes functions 302-306 may be examples of functions such as those illustrated in FIG. 2 (e.g., functions 212, 216, 220, 224, and 228). In this example, inputs 1-n are received at functions 304 and 306. Any number of inputs may be provided to functions 304 and 306. Additionally, more or fewer functions may be used besides functions 304 and 306. In this case, each of functions 304 and 306 perform individual functions and then input results to function 302, which in turn may output a value to an XSLT construct such as XslItemContainers 202-206, XslItems 208-210, or others.

Figure 4:
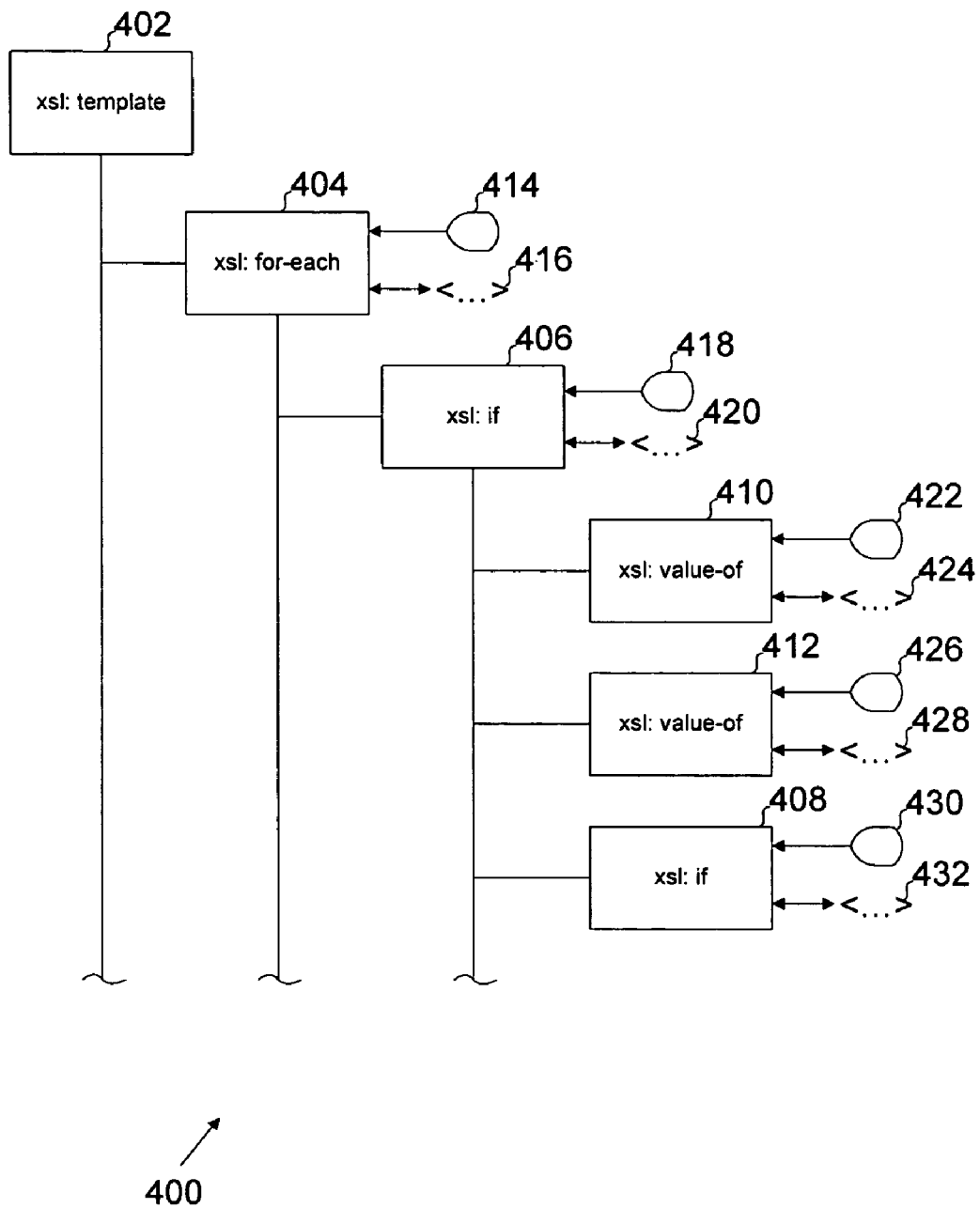
FIG. 4 illustrates an exemplary use instance of a tree fragment 400 associated with a hierarchical transformation object model.

FIG. 4 illustrates an exemplary use instance of a tree fragment 400 associated with a hierarchical transformation object model. In this example, tree fragment 400 is shown using particular XSL constructs. In other examples, different XSL constructs may be used. Here, XslItemContainers 408 are implemented using XSL constructs such as xsl: template, xsl: for-each, and xsl: if. The stylesheet element xsl: template may be used to invoke a particular type of stylesheet, which is a template for an XML document, in this case.

Figure 5:
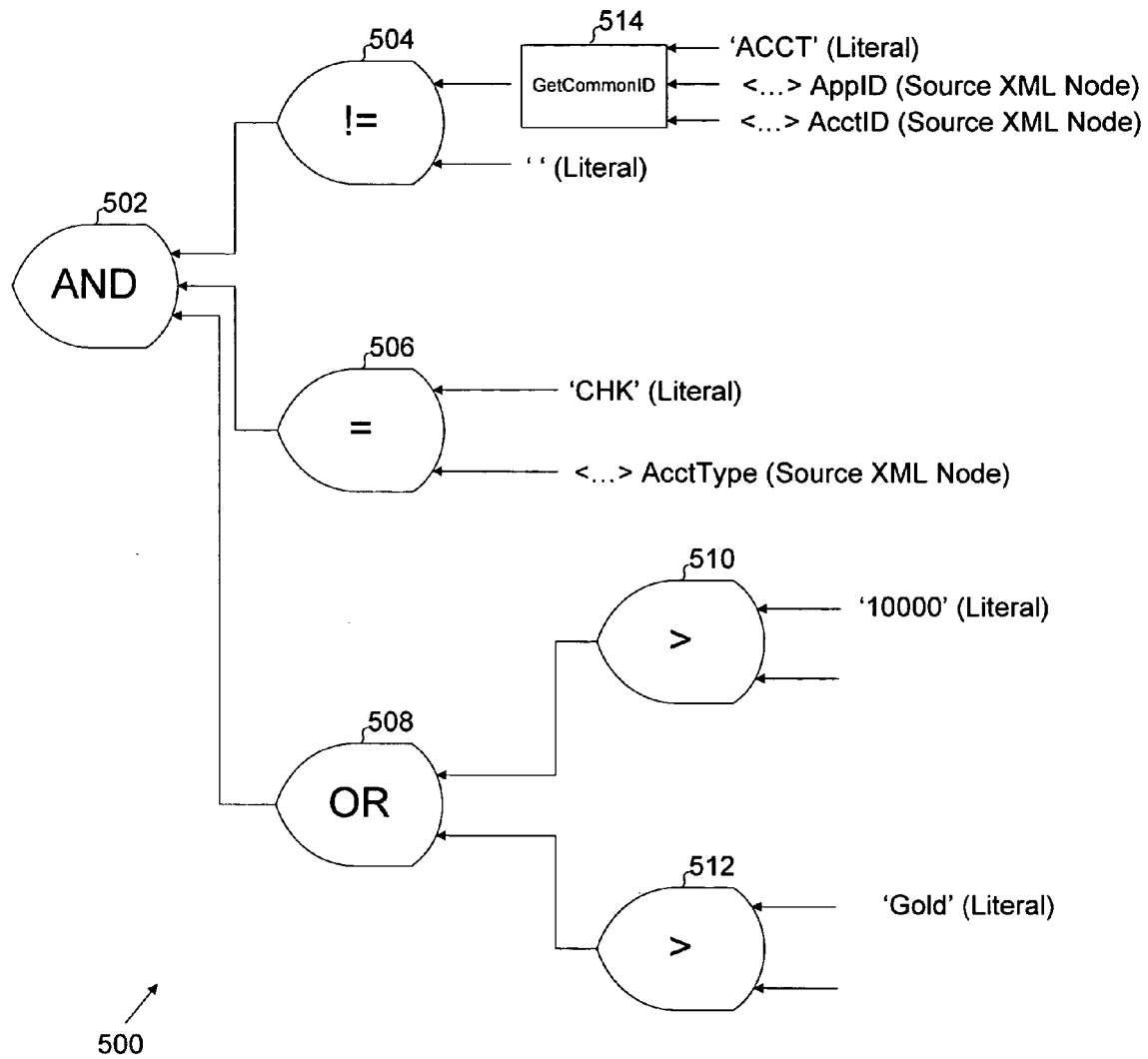
FIG. 5 illustrates an exemplary function in a use case of a hierarchical transformation object model.

XslItems 410-412 represent elements that may be used to instantiate content, such as text or a particular value, extracting the content from a source document (e.g., XSLT transformation document 106) to a target document (e.g., transformation document 132. Here, xsl: value-of is used to extract content from a source document using an expression specified in an attribute of the element. Functions 414, 418, 422, 426, and 430 are also shown, along with links to destination nodes 416, 420, 424, 428, and 432. FIG. 5 provides further detail on the use-case functions 414, 418, 422, 426, and 430.

FIG. 5 illustrates an exemplary function in a use case of a hierarchical transformation object model. Here, a tree fragment has been created, with a parent-child-grandchild node schema. Parent function 502 ('AND') includes child functions 504-508 ('!=', '=', and 'OR') and grandchild functions 510-512 ('>' and '<'). In some examples, functions are performed in a depth first fashion, performing functions 510-512 first and then functions 504-508 to eventually 502, which provides output to an XslItem such as XslItem 410 or 412 (FIG. 4).

In one example, functions 414, 418, 422, 426, and 430 may be represented using function tree fragment 500. Here, functions 502-512 receive inputs such as a literal string of text (e.g, 'ACCT'', 'CHK', '10000', 'GOLD', or others) or content from a source node of a tree related to a source XML document, such as those inputs provided to function 506 or element 514. Element 514, in this example, retrieves an ID number, which may be extracted from either a literal string, or a source XML node, as described. In other examples, elements and functions may retrieve content from different types of sources. Once received, inputs are used to perform functions such as those shown in functions 504-508. By processing tree schemas using the techniques described above, HTOM 116 may be used to create transformation document 132 and may also be used to provide a visual display of the target-to-source schema, as illustrated in the example of FIG. 6.

Figure 6:
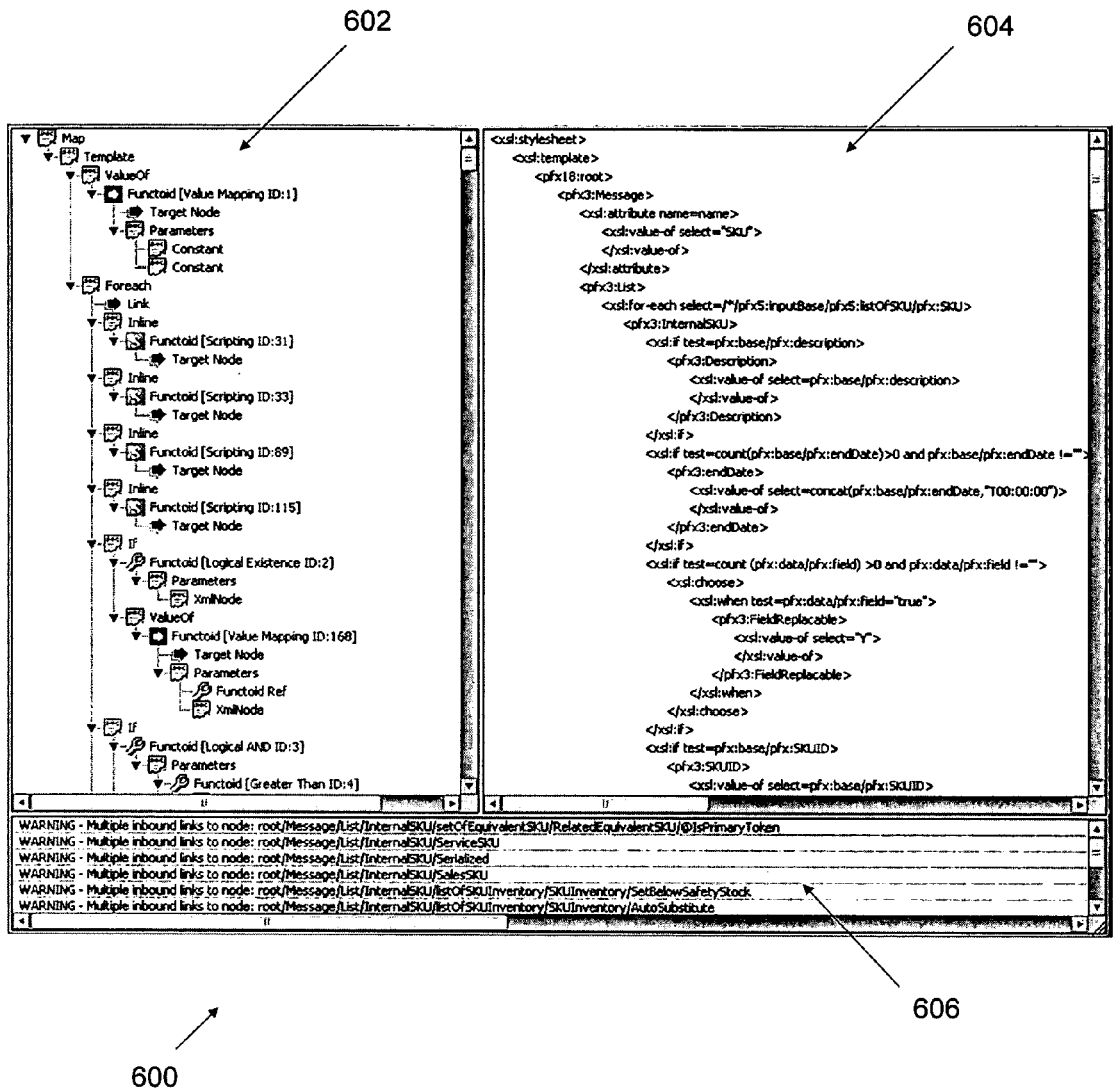
FIG. 6 illustrates an exemplary visual representation of a source-to-target schema using HTOM viewer.

FIG. 6 illustrates an exemplary visual representation 600 of a source-to-target schema using HTOM viewer 122. In some examples, visual representation 600 may be implemented as a display using HTOM viewer 122. HTOM 116 may be serialized to produce a serialized document of HTOM 116 (e.g., serialized HTOM 120), which may be sent to and displayed by HTOM viewer 122. In this example, visual representation 600 may be implemented using several screens to display a tree fragment associated with a source-to-target schema as well as results from pattern detection mechanism 115 (FIG. 1).

For example, tree window 602 illustrates XslItemContainers, XslItems, positions, functions (i.e., functoids), node and axis information, and other parameters associated with a tree fragment. Transformation document window 604 illustrates XSLT elements, attributes, and other XSLT constructs that map to the tree fragment shown in tree window 602. Also included in this example is a message window 606 for illustrating results and output messages related to XSLT transformations as a result of, for example, pattern detection mechanism 115. Mismatches, detected patterns, redundant objects, or other event-related messages may be displayed in message window 606. In other examples, fewer or more windows may be implemented. Also, different types of windows may be used to illustrate other information related to XSLT transformations. Examples of pattern specification and detection mechanisms are illustrated below in connection with FIGS. 7A-7B.

FIG. 7A illustrates an exemplary pattern specification schema. Pattern detection XML 700 illustrates a pattern that may be performed by post processor 126 to create transformation document 132. Post processor 126 analyzes an application-specific object tree to detect patterns that may indicate re-organization of the tree to resolve application-specific object model 128. Pattern detection XML 700 illustrates an XML file that may be implemented to capture information related to transformation rendering engine 124. In this example, an action ID may be selected from a pre-defined list of supported actions or algorithms. An arbitrary number of pattern elements and action parameter elements may be used.

FIG. 7B illustrates another exemplary pattern specification schema. In some examples, post processor 126 may apply pattern matching and fixing algorithms to re-arrange an object tree associated with application-specific object model 128. For example, post processor 126 may partition object trees into manageable groups to facilitate rendering of the groups on separate pages in an application schema map. Here, pattern fixing specification 710 illustrates two exemplary patterns for re-arranging an object tree associated with application-specific object model 128. The first pattern (bracketed by "<pattern>" elements) describes two functions connected to each other with a link and defines an action to remove the link if particular function ID are found (function IDs "123" and "456"). The second pattern (also bracketed by "<pattern>" elements) describes functions that are not known to application system 104, but instead points to the location of external implementations of the functions.

Figure 8:
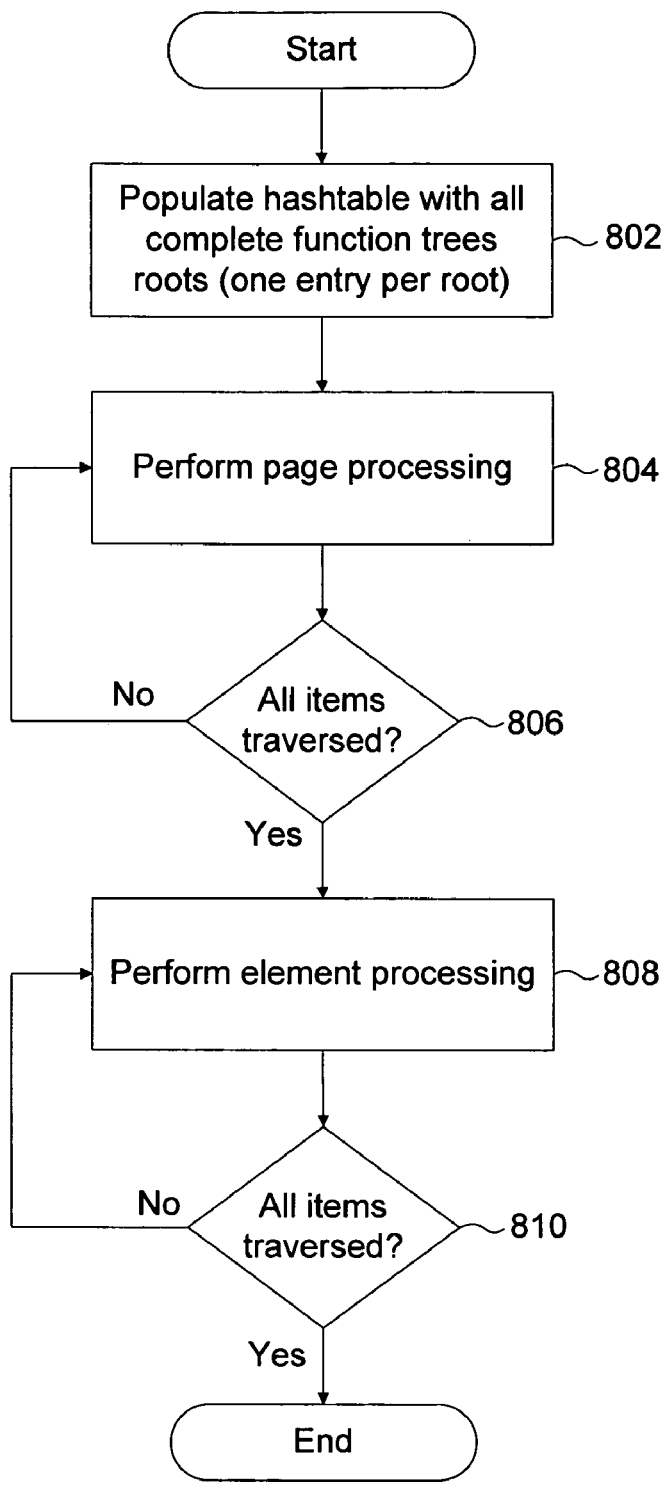
FIG. 8 is a flow chart illustrating an exemplary process for performing enhanced compiled representation of transformations.

FIG. 8 is a flow chart illustrating an exemplary process for performing enhanced compiled representation of transformations. As an example of an overall process for enhanced compiled representation of transformations (e.g., XSLT transformations), the process may be executed by the above-described systems and components of transformation system 102 and application system 104. In other examples, the described techniques may be implemented by different components or in a different sequence. Here, XSLT compiler 108 populates a hashtable with all complete function trees roots from XSLT transformation document 106, providing one entry per root (802). Once the hashtable has been populated, pagination processing may be performed (804). Next, a determination is made as to whether all items have been traversed (806). Items may be XslItems such as those described above, elements, functions, or other nodes used in trees associated with transformation documents such as XSLT transformation 106. If all items have not been traversed, then pagination processing is repeated until all items have been traversed. If all items have been traversed and pagination processing for all of these items has been performed, then elements are processed further to perform pagination (808). Again, XSLT compiler 108 determines whether all items have been traversed and, if not, repeats element processing (810). If all items in source XSLT transformation document 106 have been traversed, then HTOM 116 is generated and sent to application system 104 for generation of application-specific object model 104 and transformation document 132.

Figure 9:
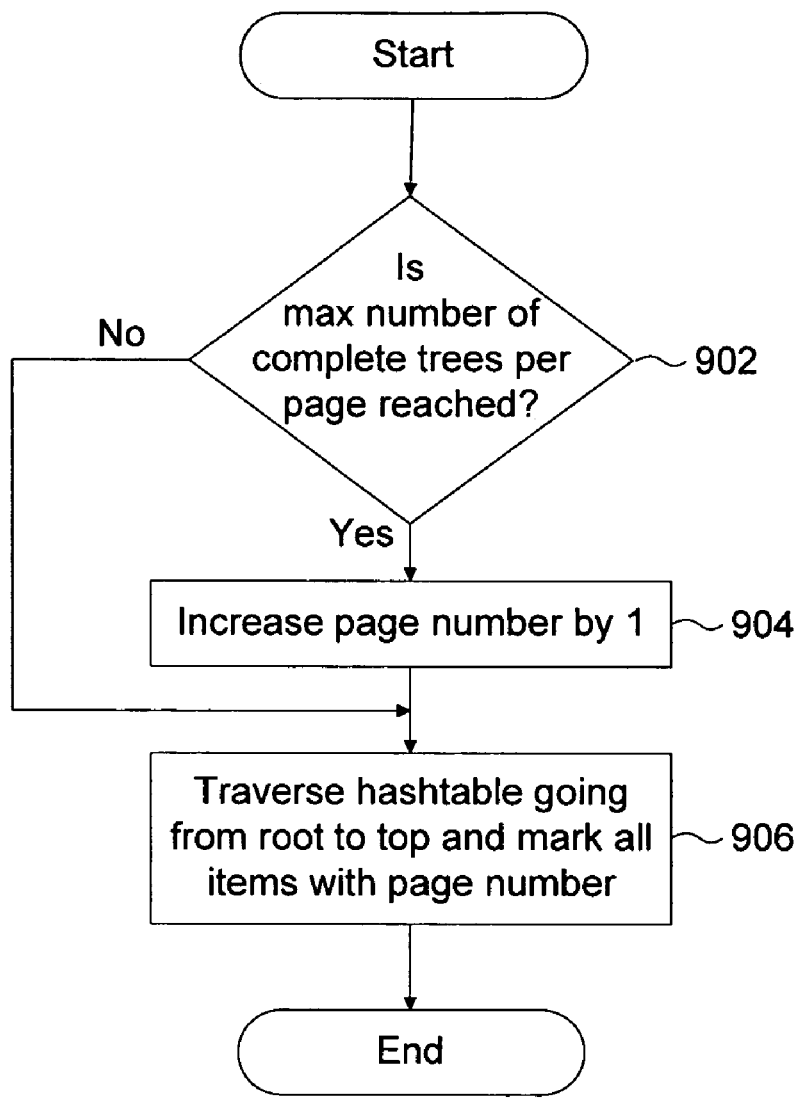
FIG. 9 is a flow chart illustrating exemplary page processing.

FIG. 9 is a flow chart illustrating exemplary page processing. In this example, performing process pagination is described in greater detail. After populating a hashtable with all complete function trees roots (one entry per root), XSLT compiler 108 determines whether a maximum number of complete trees per page limit has been reached (902). If the number of complete function trees per page limit has been reached, then a pagination count is increased by "1" (904). If not, then the current page number is not changed and the populated hashtable is traversed from roots to the top of an object tree associated with HTOM 116, marking all items with the current page number (906). If the page number is increased by "1", then the items are marked with the increased page number. This process may be repeated, as described in FIG. 8.

Figure 10:
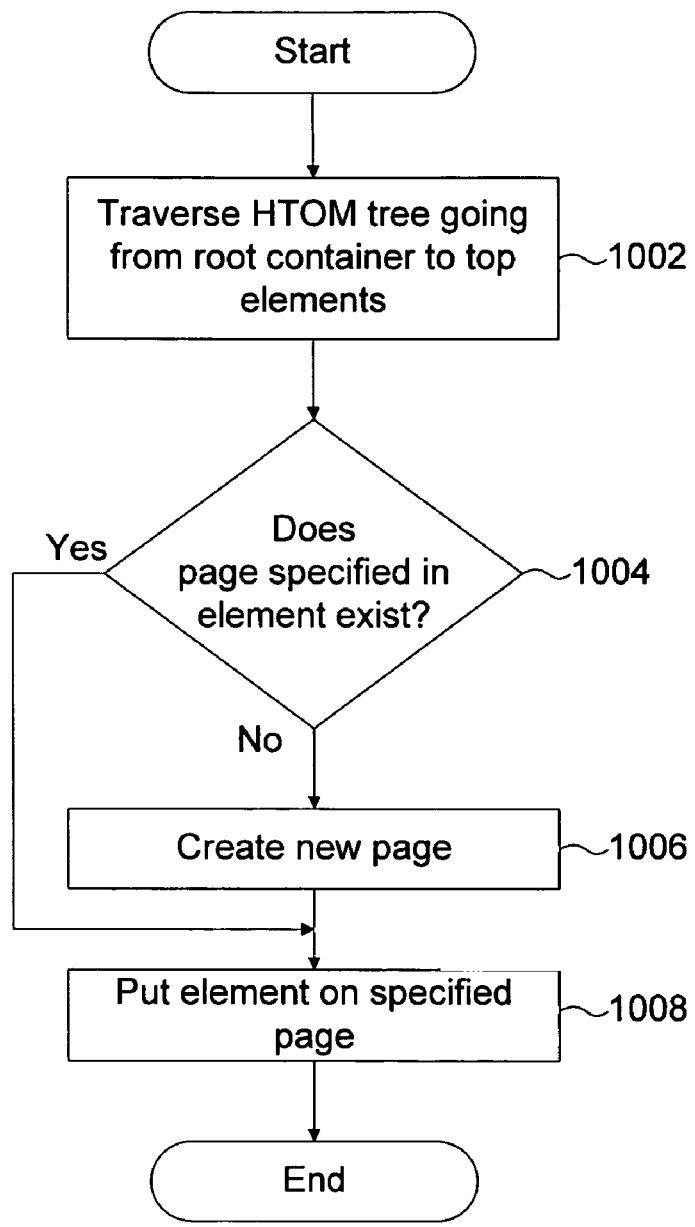
FIG. 10 is a flow chart illustrating exemplary element processing.

FIG. 10 is a flow chart illustrating exemplary element processing. An object tree associated with HTOM 116 may be traversed from root containers to top elements (1002). A determination is made as to whether a page specified in each element exists (1004). If the page number specified in an element does not exist, then a new page is created, after which the element is placed on the newly-created page (1006). If the page number specified in an element exists, then the element is placed on the specified page (1008). In addition to page and element processing, run-time generation of instances based on expression included in transformations such as XSLT transformation 106 are described, as in FIG. 11.

Figure 11:
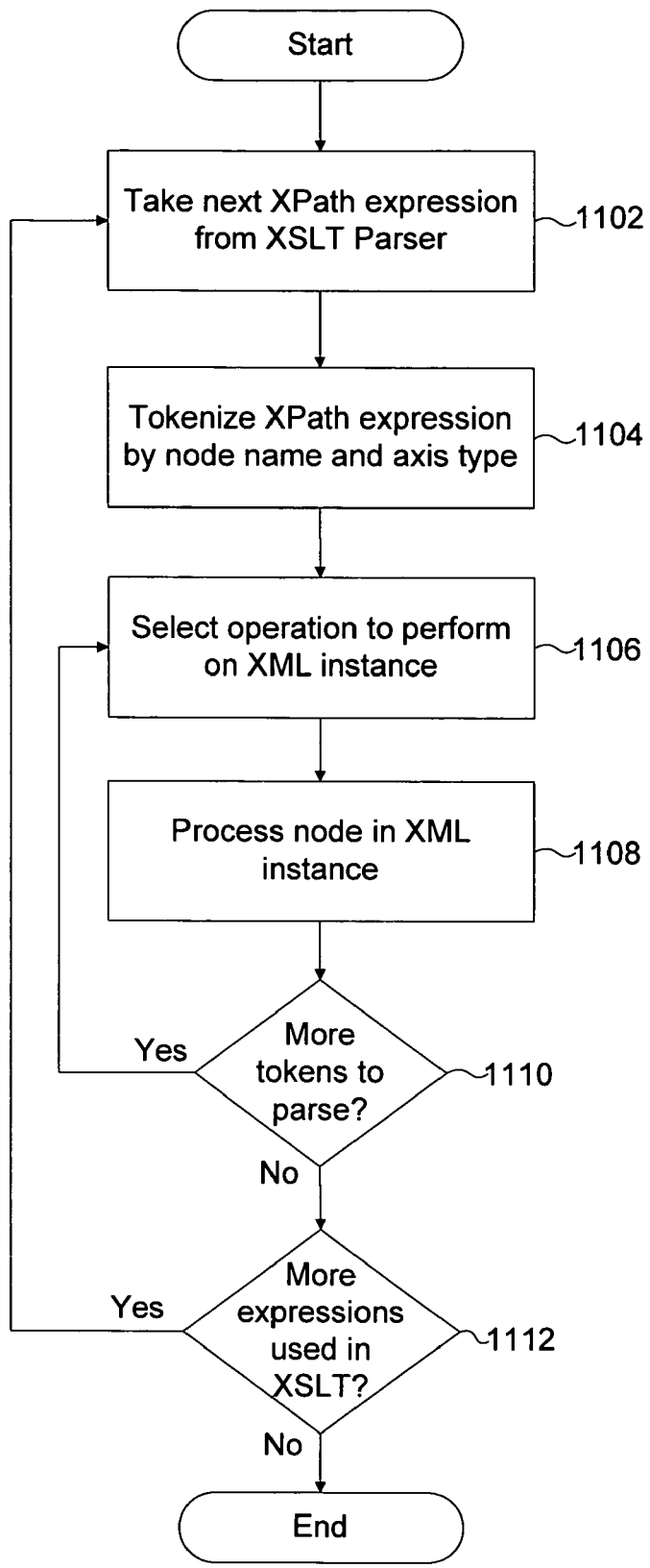
FIG. 11 is a flow chart illustrating an exemplary process for run-time generation of instances based on XPath expressions or node names.

FIG. 11 is a flow chart illustrating an exemplary process for run-time generation of instances based on XPath expressions or node names. In some examples, XSLT compiler 108 may be used to implement run-time generation of XML instances based on XPath expressions or node names. Here, an XPath expression is received from XPath compiler 112 (1102). In this example, XPath compiler 112 parses XSLT transformation 106 to resolve an XPath expression. In other examples, a different component may be used to resolve an XPath expression. Once received from XPath compiler 112, an XPath expression is tokenized using node name and axis type (1104). Based on the tokenization of an XPath expression, an operation is performed on an XML instance derived from the XPath expression (1106). In some examples, an operation may be performed based on the axis type. In other examples, operations may be performed using different parameters. Once performed, the selected node associated with the XML instance is processed (1108). Processing nodes associated with an XML instance is discussed in greater detail below in connection with FIG. 12. After processing the node in the XML instance, a determination is made as to whether there are more tokens (i.e., XPath expressions) to parse (1110). If so, then XSLT compiler 108 retrieves the next token, selecting an operation to perform on the XML instance, and processing the node in the next-parsed XML instance. However, if no more tokens are available to parse, then a determination is made as to whether there are additional XPath expression in XSLT transformation document 106 (1112).

Figure 12:
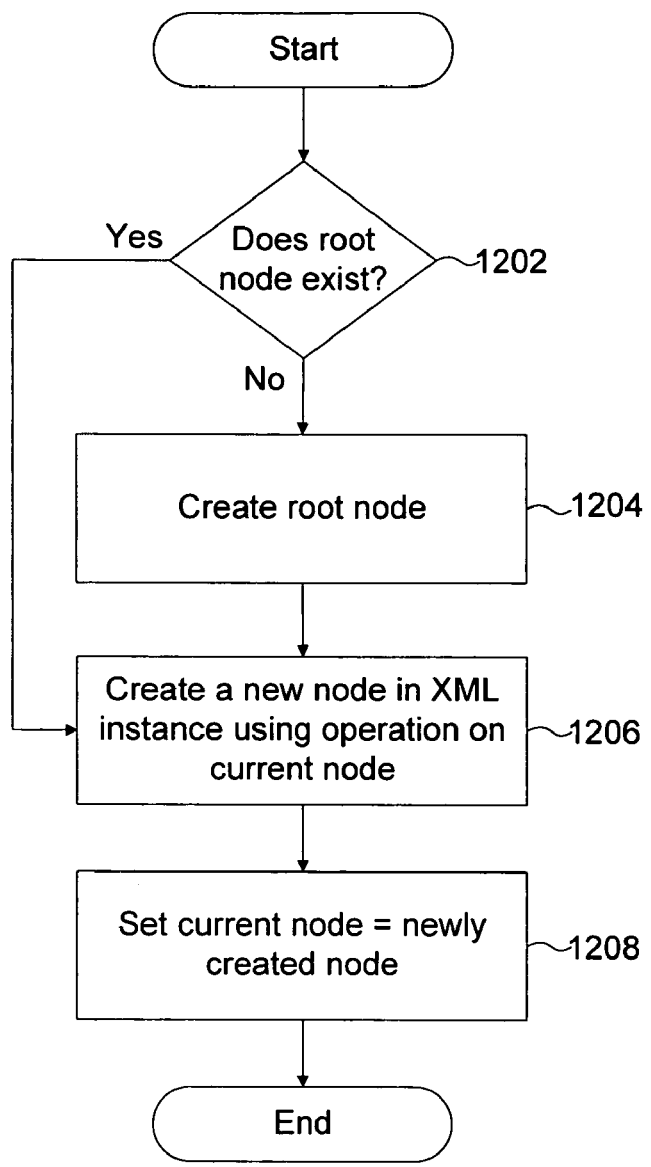
FIG. 12 is a flow chart illustrating an exemplary processing of nodes in XML instances.

FIG. 12 is a flow chart illustrating an exemplary processing of nodes in XML instances. For a given XML instance, a determination is made as to whether a root node exists (1202). If no root node exists, then a root node is created in an object tree associated with HTOM 116 (1204). Once a root node is created, or if a root node already exists, then a new node is created in the transformation target XML instance by performing an operation on the root node (1206). The current node is set equal to the newly-created node, enabling source-to-target mapping between XSLT transformation document 106 to transformation document 132 using HTOM 116.

Figure 13:
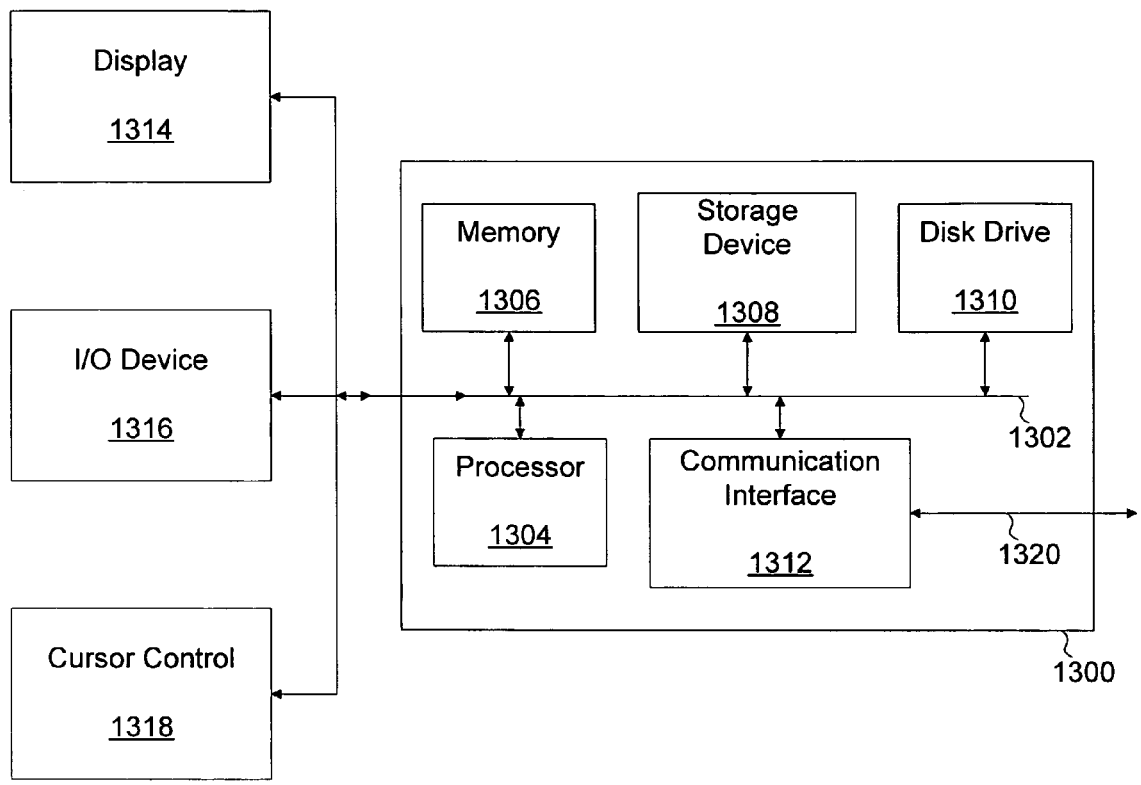
FIG. 13 is a block diagram illustrating an exemplary computer system suitable for enhanced compiled representation of data transformations.

FIG. 13 is a block diagram illustrating an exemplary computer system suitable for enhanced compiled representation of data transformations. In some examples, computer system 1300 may be used to implement the above-described techniques. Computer system 1300 includes a bus 1302 or other communication mechanism for communicating information, which interconnects subsystems and devices, such as processor 1304, system memory 1306 (e.g., RAM), storage device 1308 (e.g., ROM), disk drive 1310 (e.g., magnetic or optical), communication interface 1312 (e.g., modem or Ethernet card), display 1314 (e.g., CRT or LCD), input device 1316 (e.g., keyboard), and cursor control 1318 (e.g., mouse or trackball).

According to one embodiment of the invention, computer system 1300 performs specific operations by processor 1304 executing one or more sequences of one or more instructions contained in system memory 1306. Such instructions may be read into system memory 1306 from another computer readable medium, such as static storage device 1308 or disk drive 1310. In alternative embodiments, hard-wired circuitry may be used in place of or in combination with software instructions to implement the invention.

The term 'computer readable medium" refers to any medium that participates in providing instructions to processor 1304 for execution. Such a medium may take many forms, including but not limited to, non-volatile media, volatile media, and transmission media. Non-volatile media includes, for example, optical or magnetic disks, such as disk drive 1310. Volatile media includes dynamic memory, such as system memory 1306. Transmission media includes coaxial cables, copper wire, and fiber optics, including wires that comprise bus 1302. Transmission media can also take the form of radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1300. According to other embodiments of the invention, two or more computer systems 1300 coupled by communication link 1320 (e.g., LAN, PSTN, or wireless network) may perform the sequence of instructions to practice the invention in coordination with one another. Computer system 1300 may transmit and receive messages, data, and instructions, including program, i.e., application code, through communication link 1320 and communication interface 1312. Received program code may be executed by processor 1304 as it is received, and/or stored in disk drive 1310, or other non-volatile storage for later execution.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A computer implemented method for data transformation for a standard data format, comprising:
   receiving an Extensible Stylesheet Language transformation specification having expressions containing XPath expressions, wherein the Extensible Stylesheet Language transformation specification is received by an Extensible Stylesheet Language transformation specification compiler;
   invoking an XPath compiler to tokenize and construct a parse tree of the XPath expressions contained in the Extensible Stylesheet Language transformation specification;
   returning the parse tree from the XPath compiler to the Extensible Stylesheet Language transformation specification compiler;
   generating a hierarchical transformation object model using schema fragments parsed from a source schema tree associated with the Extensible Stylesheet Language transformation specification, wherein the hierarchical transformation object model provides an object model representation of the XPath expressions contained in the Extensible Stylesheet Language transformation specification; and
   converting the Extensible Stylesheet Language transformation specification into an application specific transformation document using the hierarchical transformation object model, wherein the application specific transformation document enables execution of the Extensible Stylesheet Language transformation specification within an application specific runtime environment.

2. A method as recited in claim 1, wherein the schema fragments are each a source schema.

3. A method as recited in claim 1, wherein the schema fragments are each a target schema.

4. A method as recited in claim 1, wherein the schema fragments are each a source-to-target schema.

5. A method as recited in claim 1, wherein the Extensible Stylesheet Language transformation specification is a document.

6. A method as recited in claim 1, wherein the Extensible Stylesheet Language transformation specification is an XML-formatted document.

7. A method as recited in claim 1, wherein the Extensible Stylesheet Language transformation specification is an object.

8. A method as recited in claim 1, wherein the Extensible Stylesheet Language transformation specification is a document object.

9. A method as recited in claim 1, wherein the Extensible Stylesheet Language transformation specification includes XML-formatted data.

10. A method as recited in claim 1, wherein the Extensible Stylesheet Language transformation specification includes a pointer.

11. A method as recited in claim 1, wherein the Extensible Stylesheet Language transformation specification includes a pointer used to transform the transformation specification into the application-specific document.

12. A method as recited in claim 1, wherein the Extensible Stylesheet Language transformation specification is a transformation document.

13. A method as recited in claim 1, wherein the Extensible Stylesheet Language transformation specification is an XSLT transformation of a source XML document.

14. A method as recited in claim 1, wherein the application specific document includes XML-formatted data.

15. A method as recited in claim 1, wherein the application specific document is an object.

16. A method as recited in claim 1, wherein the application specific document is generated using a hierarchical transformation object model and an application-specific object model.

17. A method as recited in claim 1, wherein generating a hierarchical transformation object model using schema fragments further comprises detecting a pattern in a source schema.

18. A method as recited in claim 1, wherein generating a hierarchical transformation object model using schema fragments further comprises:
   detecting a pattern in a source transformation; and
   eliminating a redundancy in a target transformation.

19. A system for data transformation for a standard data format, comprising:
   an Extensible Stylesheet Language Transformation compiler having a memory configured to received an Extensible Stylesheet Language Transformation specification having expressions containing XPath expressions; and
   an XPath compiler configured to tokenize and construct a parse tree of the XPath expressions contained in the Extensible Stylesheet Language Transformation specification, and return the parse tree to the Extensible Stylesheet Language Transformation compiler;
   the Extensible Stylesheet Language Transformation further having a processor configured to generate a hierarchical transformation object mode transformation specification into an application-specific document using the hierarchical transformation object model;
   wherein the hierarchical transformation object model comprises an object model representation of the XPath expressions contained in the Extensible Stylesheet Language Transformation specification.

20. A computer readable storage medium having computer executable instructions for performing a method to generate an application specific document comprising:
   receiving an Extensible Stylesheet Language Transformation specification expression containing XPath expressions, wherein the Extensible Stylesheet Language transformation specification is received by an Extensible Stylesheet Language transformation specification compiler;
   invoking an XPath compiler to tokenize and construct a parse tree of the XPath expressions contained in the Extensible Stylesheet Language transformation specification;
   returning the parse tree from the XPath compiler to the Extensible Stylesheet Language transformation specification compiler;
   generating a hierarchical transformation object model using schema fragments parsed from a source schema tree associated with the Extensible Stylesheet Language transformation specification wherein the hierarchical transformation object model comprises an object model representation of the XPath expressions contained in the Extensible Stylesheet Language transformation specification; and
   transforming the Extensible Stylesheet Language transformation specification into an application-specific document using the hierarchical transformation object model.

* * * * *